United States Patent
Samar

(10) Patent No.: US 7,150,038 B1
(45) Date of Patent: Dec. 12, 2006

(54) FACILITATING SINGLE SIGN-ON BY USING AUTHENTICATED CODE TO ACCESS A PASSWORD STORE

(75) Inventor: Vipin Samar, Cupertino, CA (US)

(73) Assignee: Oracle International Corp., Redwood Shores, CA (US)

( * ) Notice: Subject to any disclaimer, the term of this patent is extended or adjusted under 35 U.S.C. 154(b) by 0 days.

(21) Appl. No.: 09/544,709

(22) Filed: Apr. 6, 2000

(51) Int. Cl.
G06F 7/04 (2006.01)
G06F 15/16 (2006.01)
H04L 9/32 (2006.01)
H04L 9/00 (2006.01)

(52) U.S. Cl. ......... 726/8; 713/157
(58) Field of Classification Search ......... 713/202, 713/157
See application file for complete search history.

(56) References Cited

U.S. PATENT DOCUMENTS

| | | | | |
|---|---|---|---|---|
| 5,224,163 A * | 6/1993 | Gasser et al. | 380/30 |
| 5,611,048 A * | 3/1997 | Jacobs et al. | 713/202 |
| 5,623,637 A * | 4/1997 | Jones et al. | 711/164 |
| 5,689,638 A * | 11/1997 | Sadovsky | 726/21 |
| 5,706,427 A * | 1/1998 | Tabuki | 713/201 |
| 5,790,785 A * | 8/1998 | Klug et al. | 713/202 |
| 5,872,915 A * | 2/1999 | Dykes et al. | 713/202 |
| 6,000,033 A * | 12/1999 | Kelley et al. | 713/201 |
| 6,141,760 A * | 10/2000 | Abadi et al. | 713/202 |
| 6,182,229 B1 * | 1/2001 | Nielsen | 713/202 |
| 6,189,103 B1 * | 2/2001 | Nevarez et al. | 726/5 |
| 6,205,480 B1 * | 3/2001 | Broadhurst et al. | 709/225 |
| 6,223,292 B1 * | 4/2001 | Dean et al. | 713/202 |
| 6,269,395 B1 * | 7/2001 | Blatherwick et al. | 713/202 |
| 6,412,073 B1 * | 6/2002 | Rangan | 713/202 |
| 6,460,141 B1 * | 10/2002 | Olden | 713/202 |
| 6,496,855 B1 * | 12/2002 | Hunt et al. | 709/217 |

(Continued)

OTHER PUBLICATIONS

"The New Face of Single Sign-On" by Philip Garden, Network Computing, Mar. 22, 1999, pp. 33 to 47.
Microsoft Passport Technical White Paper. Retrieved from website: http://www.passport.com/business/whitepaper.asp.

*Primary Examiner*—Jacques Louis-Jacques
*Assistant Examiner*—Matthew Heneghan
(74) *Attorney, Agent, or Firm*—Park, Vaughan & Fleming LLP

(57) ABSTRACT

One embodiment of the present invention provides a system that facilitates accessing to a plurality of applications that require passwords. When the system receives a request for a password from an application running on a remote computer system, the system first authenticates the request to ensure that it originated from a trusted source. Next, the system uses an identifier for the application to look up the password for the application in a password store, which contains passwords associated with the plurality of applications. If the password exists in the password store, the system sends the password or a function of the password to the application on the remote computer system. Hence, the system creates the illusion that there is a single sign on to a large number of applications, whereas in reality the system automatically provides different passwords to the applications as they are requested. In one embodiment of the present invention, the request for the password includes computer code that when run on the local computer system requests the password on behalf of the application on the remote computer system. In a variation on this embodiment, the computer code is in the form of a JAVA™ applet that runs on a JAVA™ virtual machine on the local computer system. In one embodiment of the present invention, the JAVA™ applet is a signed JAVA™ applet, and authenticating the request involves authenticating the JAVA™ applet's certificate chain.

49 Claims, 3 Drawing Sheets

U.S. PATENT DOCUMENTS 6,629,246 B1 * 9/2003 Gadi .......................... 713/202

6,715,082 B1 * 3/2004 Chang et al. .................. 726/8

* cited by examiner

FACILITATING SINGLE SIGN-ON BY USING AUTHENTICATED CODE TO ACCESS A PASSWORD STORE

RELATED APPLICATION

The subject matter of this application is related to the subject matter in a co-pending non-provisional application by the same inventor as the instant application entitled, "Method and Apparatus for Facilitating Single Sign On through Redirection to a Login Server," having Ser. No. 09/550,725, and filing date 17 Apr. 2000.

BACKGROUND

1. Field of the Invention

The present invention relates to security in a distributed computing environment. More specifically, the present invention relates to a method and an apparatus for facilitating a single sign on to multiple applications by using applets (or other code fragments, modules or plug-ins) to access a password store.

2. Related Art

With the recent proliferation of web-based applications, the number of remote applications a typical user accesses has grown dramatically. For security purposes, it is often necessary to authenticate a user before allowing the user to access certain applications. This type of authentication is most commonly accomplished by requiring the user to provide a password for each application. This solution has been generally satisfactory until recently because users have typically accessed only a small number of applications.

However, this solution becomes less satisfactory when a large number of applications are involved. This is because it is extremely burdensome for a user to have to enter dozens of passwords each day. Furthermore, the proliferation in applications requiring passwords tends to compromise security because a user is typically unable to remember dozens of different passwords for dozens of different applications.

In order to keep track of different passwords, a user can write down all of the different passwords on yellow sticky notes attached to a computer monitor. However, writing passwords down in this way can greatly compromise security.

More typically, a user uses a single password for all of the different applications the user accesses. This creates even more of a security problem because this single password is known by numerous applications running on numerous computing systems. If any one of these applications or computer systems is insecure, the secrecy of the single password can be compromised.

Furthermore, as the number of passwords proliferate, help desks become burdened with requests to deal with forgotten or misplaced passwords, which can increase the cost of administering applications.

Additionally, users tend to use the simplest and shortest password possible in order to reduce the time required to enter the password and to make the password easy to remember. However, these shorter and simpler passwords tend to be less random and can be more easily cracked.

One solution to the authentication problem is to employ the public key infrastructure (PKI) to authenticate a user to various applications. PKI makes use of public key-private key pairs and chains of digital certificates to authenticate a user to an application. However, PKI has yet to be widely adopted because solutions to technical problems relating to certificate management and key life-cycle management are still being developed. Furthermore, it is difficult to retrofit legacy applications to make use of PKI.

Another solution to the authentication problem is to provide a single sign on facility. In a conventional single sign on facility, a user's passwords are stored in a single password store protected by login authentication or by operating system authentication. When an application is run, it retrieves a password associated with the application from the password store.

However, the problem with using a conventional password store is that it is possible for a rogue application to read the entire password store. Hence, users must completely trust all of the applications that have access to the password store.

What is needed is a method and an apparatus for providing a single sign on facility that does not require the applications that make use of the single sign on facility to be completely trusted.

SUMMARY

One embodiment of the present invention provides a system that facilitates accessing to a plurality of applications that require passwords. When the system receives a request for a password from an application running on a remote computer system, the system first authenticates the request to ensure that it originated from a trusted source. Next, the system uses an identifier for the application to look up the password for the application in a password store, which contains passwords associated with the plurality of applications. If the password exists in the password store, the system sends the password or a function of the password to the application on the remote computer system. Hence, the system creates the illusion that there is a single sign on to a large number of applications, whereas in reality the system automatically provides different passwords to the applications as they are requested.

In one embodiment of the present invention, the request for the password includes computer code that when run on the local computer system requests the password on behalf of the application on the remote computer system. In a variation on this embodiment, the computer code is in the form of a downloadable piece of software or an installed piece of software that runs in the execution environment of the local machine. In a variation on this embodiment, the computer code is in the form of a JAVA™ applet that runs on a JAVA™ virtual machine on the local computer system. In a variation on this embodiment, sending the password or the function of the password to the application to the remote computer system involves communicating the password to the JAVA™ applet, and allowing the JAVA™ applet to forward the password to the application on the remote computer system.

In one embodiment of the present invention, the JAVA™ applet is a signed JAVA™ applet, and authenticating the request involves authenticating the JAVA™ applet's certificate chain.

In one embodiment of the present invention, authenticating the request involves authenticating the creator of the request.

In one embodiment of the present invention, authenticating the request involves authenticating the remote computer system that sent the request.

In one embodiment of the present invention, if the password store is being accessed for the first time, the system prompts a user for a single sign on password, and uses the single sign on password to open the password store.

In one embodiment of the present invention, if a time out period for the password store expires, the system prompts the user again for the single sign on password for the password store, and then uses the single sign on password to open the password store.

In one embodiment of the present invention, if the password store is being accessed for the first time, the system authenticates the user through an authentication mechanism. This authentication mechanism can include a smart card, a biometric authentication mechanism or a public key infrastructure.

In one embodiment of the present invention, if the password does not exist in the password store, the system adds the password to the password store, and then sends the password to the application on the remote computer system. In a variation on this embodiment, adding the password to the password store involves automatically generating the password. In another variation on this embodiment, adding the password to the password store involves asking a user to provide the password.

In one embodiment of the present invention, the system additionally decrypts data in the password store prior to looking up the password in the password store.

In one embodiment of the present invention, the password store is located on a second remote computer system.

In one embodiment of the present invention, the password store is located on a local smart card, a floppy disk, or a memory button.

In one embodiment of the present invention, the system receives a request to change the password from the application on the remote computer system. In response to this request, the system automatically generates a replacement password and stores the replacement password in the password store. Next, the system forwards the replacement password or the password function to the application on the remote computer system.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital video discs), and computer instruction signals embodied in a transmission medium (with or without a carrier wave upon which the signals are modulated). For example, the transmission medium may include a communications network, such as the Internet.

Distributed Computing System

Figure 1:
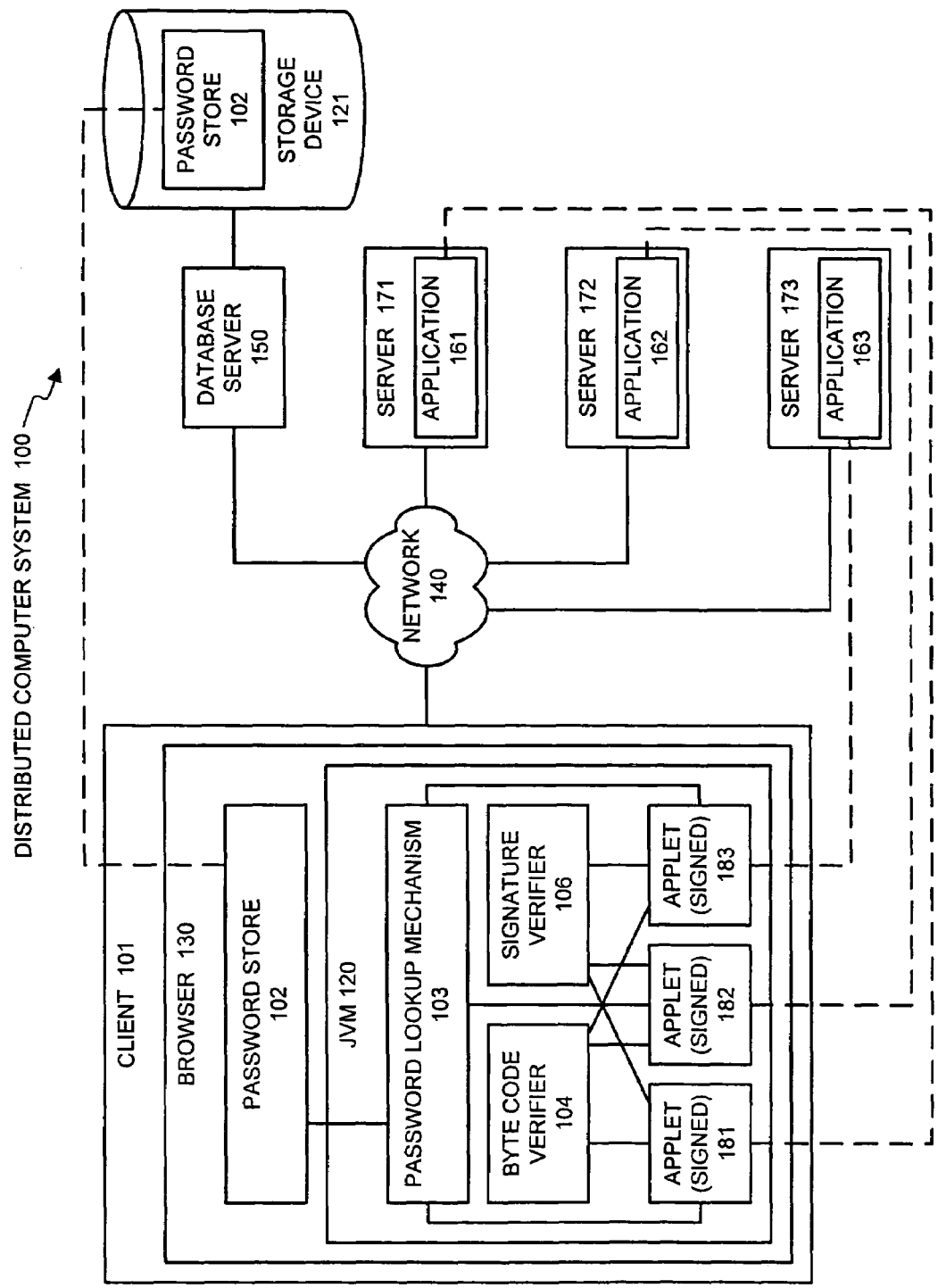
FIG. 1 illustrates a distributed computer system in accordance with an embodiment of the present invention.

FIG. 1 illustrates a distributed computer system 100 in accordance with an embodiment of the present invention. Distributed computer system 100 includes a number of clients, including client 101. Client 101 communicates across network 140 with servers 171–173 and database server 150. Client 101 can include any node on network 140 including computational capability and including a mechanism for communicating across network 140 with servers 171–173 and data server 150. Network 140 can include any type of wire or wireless communication channel capable of coupling together computing nodes. This includes, but is not limited to, a local area network, a wide area network, or a combination of networks. In one embodiment of the present invention, network 140 includes the Internet. Servers 171–173 can include any nodes on network 140 including a mechanism for servicing requests from client 101 for computational and/or data storage resources. Database server 150 can include any node on network 140 including a mechanism for processing database access requests.

Client 101 includes browser 130. Browser 130 can include any type of web browser capable of viewing a web site, such as the INTERNET EXPLORER™ browser distributed by the Microsoft Corporation of Redmond, Wash.

In the embodiment illustrated in FIG. 1, web browser 130 includes a JAVA VIRTUAL MACHINE™ (JVM) 120 that executes platform-independent instructions in the form of JAVA™ applets comprising JAVA™ bytecodes. (The terms JAVA, JAVA VIRTUAL MACHINE and JAVA DEVELOPMENT KIT are trademarks of SUN Microsystems, Inc. of Palo Alto, Calif.)

JVM 120 executes a number of applets 181–183 that originate from applications 161–163, respectively, located on servers 171–173, respectively. Note that applets 181–183 are "signed applets." A signed applet includes a digital signature, which is generated and verified through use of a private key-public key pair.

The JAVA DEVELOPMENT KIT™ (JDK) 1.2 (distributed by SUN Microsystems, Inc. of Palo Alto, Calif.) provides a facility to authenticate a signed applet to verify whether the signed applet originates from a trusted source. This facility includes mechanisms to perform authentication through a chain of digital certificates. This authentication facility is generally contained within signature verifier 106 in FIG. 1. JDK 1.2 gives a signed applet access to system resources selectively, through a permissions model that allows fine-grained accesses to system resources.

JVM 120 additionally includes a bytecode verifier 104 that verifies that bytecodes within applets 181–183 are properly formed.

Applets 181–183 request passwords on behalf of applications 161–163, respectively, on servers 171–173, respectively. These requests are directed to password lookup mechanism 103, which looks up the requested passwords in password store 102. In one embodiment of the present invention, password store 102 is located on client 101. In another embodiment, password store 102 is located within storage device 121 coupled to database server 150. In this embodiment, a user is able to access his or her password store from any location on network 140.

In one embodiment of the present invention, database server 150 can be accessed by using commands adhering to the lightweight directory access protocol (LDAP). Password store 102 can alternatively be stored on a smart card.

Figure 2:
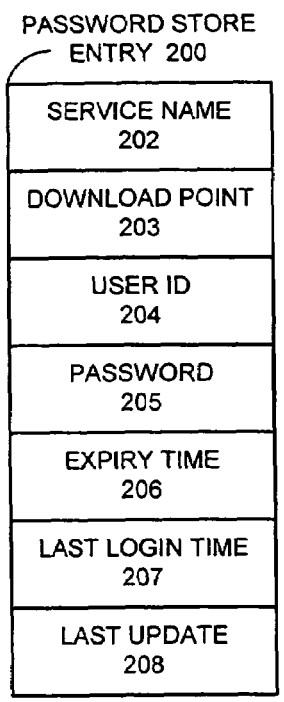
FIG. 2 illustrates the structure of an entry in a password store in accordance with an embodiment of the present invention.

FIG. 2 illustrates the structure of an entry 200 within password store 102 in accordance with an embodiment of the present invention. Entry 200 includes a number of fields, including service name 202, download point 203, user ID 204, password 205, expiry time 206, last login time 207 and last update time 208. Service name 202 includes an identifier for the service (or application) that is requesting the password. Download point 203 contains an identifier for the point from which the applet is downloaded to client 101. For example, in FIG. 1 applet 181 is downloaded from server 171. User ID 204 specifies the name of the user that is requesting access to applications 161–163. Password 205 specifies the password associated with user ID 204. Note that user ID 204 is typically sent along with password 205 or a function of the password to an application. Expiry time 206 specifies an expiration time for password 205. Last login time 207 specifies when the user associated with user ID 204 was last logged in to the application specified by service name 202. Last update 208 specifies when password store entry 200 was last updated.

Single Sign On Process

Figure 3:
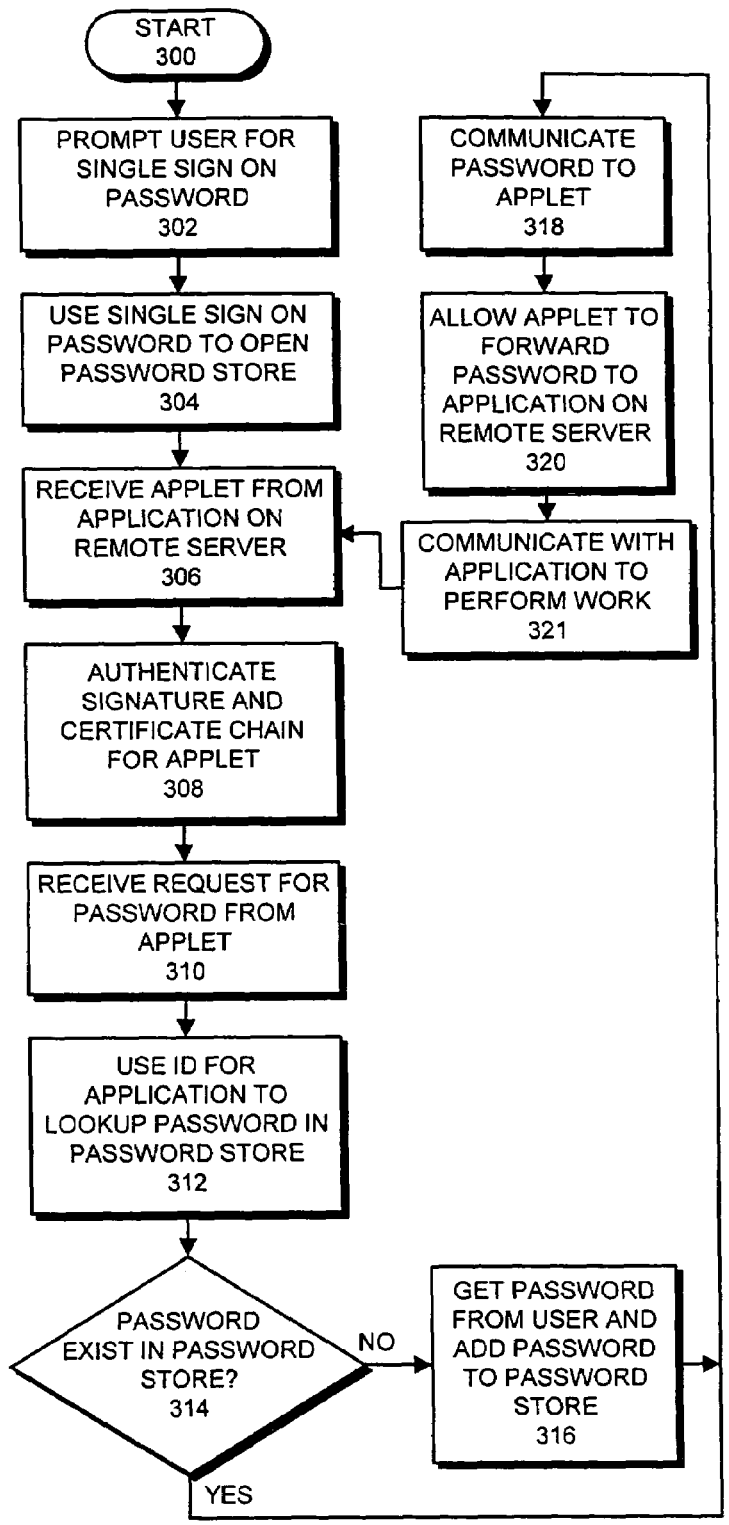
FIG. 3 is a flow chart illustrating the process of facilitating a single sign on in accordance with an embodiment of the present invention.

FIG. 3 is a flow chart illustrating the process of facilitating a single sign on in accordance with an embodiment of the present invention. The system starts at 300, first prompts the user for a single sign on password (step 302), and then uses the single sign on password to open password store 102 (step 304). In one embodiment of the present invention, the process of opening password store 102 includes using the single sign on password to decrypt the password store. Note that the process of opening password store 102 can take place during system initialization. Alternatively, it can take place the first time password store 102 is accessed after system initialization.

Next the system receives an applet from an application on a server (step 306). For example, client 101 can receive an applet 181 from application 161 on server 171.

JVM 120 authenticates a digital signature and certificate chain for applet 181 (step 308). Note that JDK 1.2 is presently configured to perform such authentication. This authentication gives JVM 120 a very high degree of confidence that applet 181 originated from application 161. Without such authentication, client 101 may give out a password to a rogue application that pretends to be application 161.

Next, JVM 120 executes applet 181. During this execution, applet 181 requests a password from client 101 on behalf of application 161. This request is received by client 101 (step 310).

Also note that this authentication can involve authenticating the machine (download point) that sent applet 181, which in this case is server 171. The authentication can also involve authenticating the application that sent applet 181, which in this case is application 161.

As an alternative to authentication through digital certificates, the system can instead verify that applet 181 originated from a specific uniform resource location (URL) or Internet protocol (IP) address. This verification gives the system some measure of confidence that applet 181 originated from a trusted source. However, this alternative is not as secure as authenticating a digital signature.

Next, the system uses user ID 204 and service name 202 to look up password 205 in password store 102 (step 312). If password 205 does not exist in password store 102 (step 314), the system adds password 205 to password store 102 (step 316). This may involve prompting the user for password 205, and subsequently adding the password 205 to password store 102.

Finally, the system communicates password 205 (and possibly user ID 204) to applet 181 (step 318), and allows applet 181 to forward password 205 to application 161 on server 171 (step 320). At this point, the user can communicate with application 161 so that application 161 can perform whatever work is required by the user (step 321).

Note that the present invention is not limited to using JAVA™ applets to perform the password lookup. Other embodiments of the present invention use other types of code including ACTIVEX™ and signed ACTIVEX™ code. (ActiveX is a Trademark of the Microsoft Corporation of Redmond, Wash.).

Process of Generating Replacement Password

Figure 4:
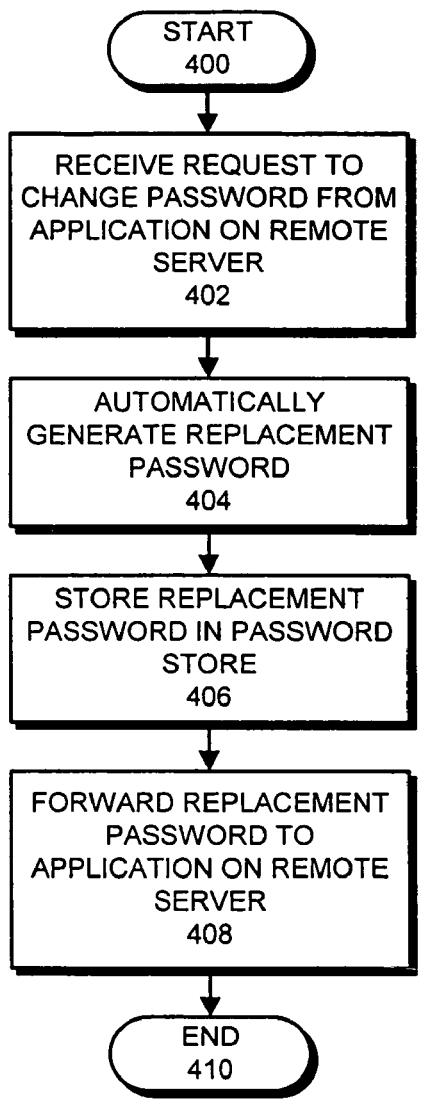
FIG. 4 is a flow chart illustrating the process of automatically generating a replacement password in accordance with an embodiment of the present invention.

FIG. 4 is a flow chart illustrating the process of automatically generating a replacement password in accordance with an embodiment of the present invention. This happens commonly because many applications require passwords to be periodically changed for security purposes.

The system starts starts at 400 and then proceeds by receiving a request to change a password from an application, such as application 161 on server 171 (step 402). In response to this request, the system automatically generates a replacement password (step 404). Since the computer system (and not a human being) generates the replacement password, the replacement password can be quite long and quite random, which makes the password more secure.

In one embodiment of the present invention, the request is received in the form of a password update applet from application 161. This applet is authenticated as is described above with reference to step 308.

The system then stores the replacement password in the associated entry within password store 102 (step 406), and then forwards the replacement password to application 161 on application server 171 (step 408).

As part of sending the replacement password to application 161, the system may additionally send the old password (or a function of the old password) so that application 161 can verify that the entity that generated the replacement password was in possession of the old password. The process completes at 410.

Process of Opening Password Store

Figure 5:
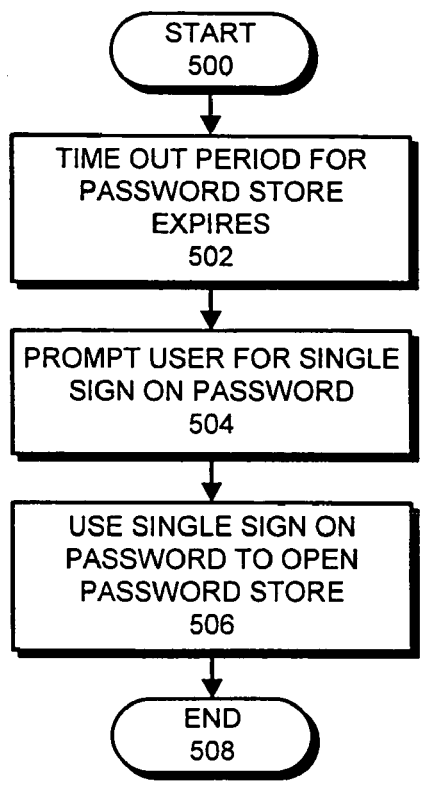
FIG. 5 is a flow chart illustrating the process of opening the password store after a time out period has expired in accordance with an embodiment of the present invention.

FIG. 5 is a flow chart illustrating the process of opening password store 102 after a time out period has expired in accordance with an embodiment of the present invention. The process starts at 500 and proceeds when a time out period of password store 102 expires (step 502). In response to this expiration, the system again prompts the user for the single sign on password (step 504). The system uses the single sign on password to open the password store (step 506). The process then terminates at 508.

This time out period can be set by the user. For example, the user can set the time out period to be nine hours. In this case, when the user signs on in the morning, this single sign on will be good for the rest of the business day. This prevents somebody from coming into the user's office during the night and using the active single sign on session to make unauthorized accesses the all of the applications that are covered by the single sign on system.

The foregoing descriptions of embodiments of the invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for facilitating access to a plurality of applications that require passwords, comprising:
    receiving a request for a password from an application running on a remote computer system, the request being received at a local computer system;
    authenticating the request as originating from a trusted source, wherein authenticating the request involves authenticating the remote computer system that sent the request;
    using an identifier for the application to look up the password for the application in a password store containing a plurality of passwords associated with the plurality of applications, wherein the plurality of passwords allows a different password to be used with each application of the plurality of applications;
    if the password exists in the password store, sending the password or a function of the password to the application on the remote computer system;
    receiving a second request to change the password from the application on the remote computer system;
    automatically generating a replacement password;
    storing the replacement password in the password store; and
    forwarding the replacement password or the password function to the application on the remote computer system.

2. The method of claim 1, wherein authenticating the request involves authenticating a creator of the request.

3. The method of claim 1, further comprising, if the password store is being accessed for the first time,
    prompting a user for a single sign on password for the password store; and
    using the single sign on password to open the password store.

4. The method of claim 3, wherein if a time out period for the password store expires,
    prompting the user again for the single sign on password for the password store; and
    using the single sign on password to open the password store.

5. The method of claim 1, wherein if the password store is being accessed for the first time, the method further comprises authenticating the user through an authentication mechanism, wherein the authentication mechanism includes one of:
    a smart card;
    a biometric authentication mechanism; and
    a public key infrastructure.

6. The method of claim 1, wherein if the password does not exist in the password store, the method further comprises:
    adding the password to the password store; and
    sending the password to the application on the remote computer system.

7. The method of claim 6, wherein adding the password to the password store further comprises automatically generating the password.

8. The method of claim 6, wherein adding the password to the password store further comprises asking a user to provide the password.

9. The method of claim 1, further comprising decrypting data in the password store prior to looking up the password in the password store.

10. The method of claim 1, wherein the password store is located on a second remote computer system.

11. The method of claim 1, wherein the password store is located on one of:
    a local smart card;
    a removable storage medium; and
    a memory button.

12. The method of claim 1, wherein the request for the password includes computer code that when run on the local computer system requests the password on behalf of the application on the remote computer system.

13. The method of claim 12, wherein the computer code is in the form of a platform-independent applet that runs on a platform-independent virtual machine on the local computer system.

14. The method of claim 13, wherein sending the password or the function of the password to the application to the remote computer system involves:
    communicating the password to the platform-independent applet; and
    allowing the platform-independent applet to forward the password to the application on the remote computer system.

15. The method of claim 13, wherein the platform-independent applet is a signed platform-independent applet, and wherein authenticating the request includes authenticating the platform-independent applet's certificate chain.

16. A computer-readable storage medium storing instructions that when executed by a computer cause the computer to perform a method for facilitating access to a plurality of applications that require passwords, the method comprising:
    receiving a request for a password from an application running on a remote computer system, the request being received at a local computer system;
    authenticating the request as originating from a trusted source, wherein authenticating the request involves authenticating the remote computer system that sent the request;
    using an identifier for the application to look up the password for the application in a password store containing a plurality of passwords associated with the plurality of applications, wherein the plurality of passwords allows a different password to be used with each application of the plurality of applications;
    if the password exists in the password store, sending the password or a function of the password to the application on the remote computer system;
    receiving a second request to change the password from the application on the remote computer system;
    automatically generating a replacement password;
    storing the replacement password in the password store; and
    forwarding the replacement password or the password function to the application on the remote computer system.

17. The computer-readable storage medium of claim 16, wherein authenticating the request involves authenticating a creator of the request.

18. The computer-readable storage medium of claim 16, wherein the method further comprises, if the password store is being accessed for the first time,
   prompting a user for a single sign on password for the password store; and
   using the single sign on password to open the password store.

19. The computer-readable storage medium of claim 18, wherein if a time out period for the password store expires, the method further comprises:
   prompting the user again for the single sign on password for the password store; and
   using the single sign on password to open the password store.

20. The computer-readable storage medium of claim 16, wherein if the password store is being accessed for the first time, the method further comprises authenticating the user through an authentication mechanism, wherein the authentication mechanism includes one of:
   a smart card;
   a biometric authentication mechanism; and
   a public key infrastructure.

21. The computer-readable storage medium of claim 16, wherein if the password does not exist in the password store, the method further comprises:
   adding the password to the password store; and
   sending the password to the application on the remote computer system.

22. The computer-readable storage medium of claim 21, wherein adding the password to the password store further comprises automatically generating the password.

23. The computer-readable storage medium of claim 21, wherein adding the password to the password store further comprises asking a user to provide the password.

24. The computer-readable storage medium of claim 16, wherein the method further comprises decrypting data in the password store prior to looking up the password in the password store.

25. The computer-readable storage medium of claim 16, wherein the password store is located on a second remote computer system.

26. The computer readable storage medium of claim 16, wherein the password store is located on one of:
   a local smart card;
   a removable storage medium; and
   a memory button.

27. The computer-readable storage medium of claim 16, wherein the request for the password includes computer code that when run on the local computer system requests the password on behalf of the application on the remote computer system.

28. The computer-readable storage medium of claim 27, wherein the computer code is in the form of a platform-independent applet that runs on a platform-independent virtual machine on the local computer system.

29. The computer-readable storage medium of claim 28, wherein sending the password or the function of the password to the application to the remote computer system involves:
   communicating the password to the platform-independent applet; and
   allowing the platform-independent applet to forward the password to the application on the remote computer system.

30. The computer-readable storage medium of claim 28, wherein the platform-independent applet is a signed platform-independent applet, and wherein authenticating the request includes authenticating the platform-independent applet's certificate chain.

31. An apparatus that facilitates accessing a plurality of applications that require passwords, comprising:
   a receiving mechanism that receives a request for a password from an application running on a remote computer system, the request being received at a local computer system;
   an authentication mechanism that authenticates the request as originating from a trusted source, wherein the authentication mechanism is configured to authenticate the remote computer system that sent the request;
   a lookup mechanism that uses an identifier for the application to look up the password for the application in a password store containing a plurality of passwords associated with the plurality of applications, wherein the plurality of passwords allows a different password to be used with each application of the plurality of applications;
   a forwarding mechanism that sends the password to the application on the remote computer system if the password exists in the password store; and
   a password changing mechanism that is configured to:
      receive a request to change the password from the application on the remote computer system;
      automatically generate a replacement password;
      store the replacement password in the password store; and to
      forward the replacement password to the application on the remote computer system.

32. The apparatus of claim 31, wherein the authentication mechanism is configured to authenticate a creator of the request.

33. The apparatus of claim 31, wherein if the password store is being accessed for the first time, the lookup mechanism is configured to:
   prompt a user for a single sign on password for the password store; and to
   use the single sign on password to open the password store.

34. The apparatus of claim 33, wherein if a time out period for the password store expires, the lookup mechanism is configured to:
   prompt the user again for the single sign on password for the password store; and to
   use the single sign on password to open the password store.

35. The apparatus of claim 31, wherein if the password store is being accessed for the first time, the lookup mechanism is configured to authenticate the user through an authentication mechanism, wherein the authentication mechanism includes one of:
   a smart card;
   a biometric authentication mechanism; and
   a public key infrastructure.

36. The apparatus of claim 31, further comprising an insertion mechanism, wherein if the password does not exist in the password store the insertion mechanism is configured to:
   add the password to the password store; and to
   send the password to the application on the remote computer system.

37. The apparatus of claim 36, wherein the insertion mechanism is additionally configured to automatically generate the password.

38. The apparatus of claim 36, wherein the insertion mechanism is additionally configured to ask a user to provide the password.

39. The apparatus of claim 31, further comprising a decryption mechanism that is configured to decrypt data in the password store.

40. The apparatus of claim 31, wherein the password store is located on a second remote computer system.

41. The apparatus of claim 31, wherein the password store is located on one of:
- a local smart card;
- a removable storage medium; and
- a memory button.

42. The apparatus of claim 31, wherein the request for the password includes computer code that when run on the local computer system requests the password on behalf of the application on the remote computer system.

43. The apparatus of claim 42, wherein the computer code is in the form of a platform-independent applet that runs on a platform-independent virtual machine on the local computer system.

44. The apparatus of claim 43, wherein the forwarding mechanism is configured to send the password to the application on the remote computer system by:
- communicating the password to the platform-independent applet; and
- allowing the platform-independent applet to forward the password to the application on the remote computer system.

45. The apparatus of claim 43, wherein the platform-independent applet is a signed platform-independent applet, and wherein the authentication mechanism is configured to authenticate a certificate chain.

46. A method for facilitating access to a plurality of applications that require passwords, comprising:
- receiving a request to look up a password at a password server;
- authenticating the request as originating from a trusted source, wherein authenticating the request involves authenticating the remote computer system that sent the request;
- wherein the request is received from a client and includes an identifier for an application requesting the password from the client;
- using the identifier for the application to look up the password for the application in a password store containing a plurality of passwords associated with the plurality of applications, wherein the plurality of passwords allows a different password to be used with each application of the plurality of applications;
- if the password exists in the password store, sending the password or a function of the password to the client, so that the client can present the password to the application;
- receiving a second request from the client to change the password at the password server;
- automatically generating a replacement password;
- storing the replacement password in the password store; and
- forwarding the replacement password or the password to the client.

47. The method of claim 46, wherein the request is received from computer code running on the client that requests the password on behalf of the application.

48. The method of claim 47, wherein the computer code is in the form of a platform-independent applet that runs on a platform-independent virtual machine on the client.

49. A server that distributes code for facilitating access to a plurality of applications that require passwords, wherein the code operates by:
- receiving a request for a password from an application running on a remote computer system, the request being received at a local computer system;
- authenticating the request as originating from a trusted source, wherein authenticating the request involves authenticating the remote computer system that sent the request;
- using an identifier for the application to look up the password for the application in a password store containing a plurality of passwords associated with the plurality of applications, wherein the plurality of passwords allows a different password to be used with each application of the plurality of applications;
- if the password exists in the password store, sending the password or a function of the password to the application on the remote computer system;
- receiving a second request to change the password from the application on the remote computer system;
- automatically generating a replacement password;
- storing the replacement password in the password store; and
- forwarding the replacement password or the password function to the application on the remote computer system.

* * * * *